Patented Sept. 20, 1927.

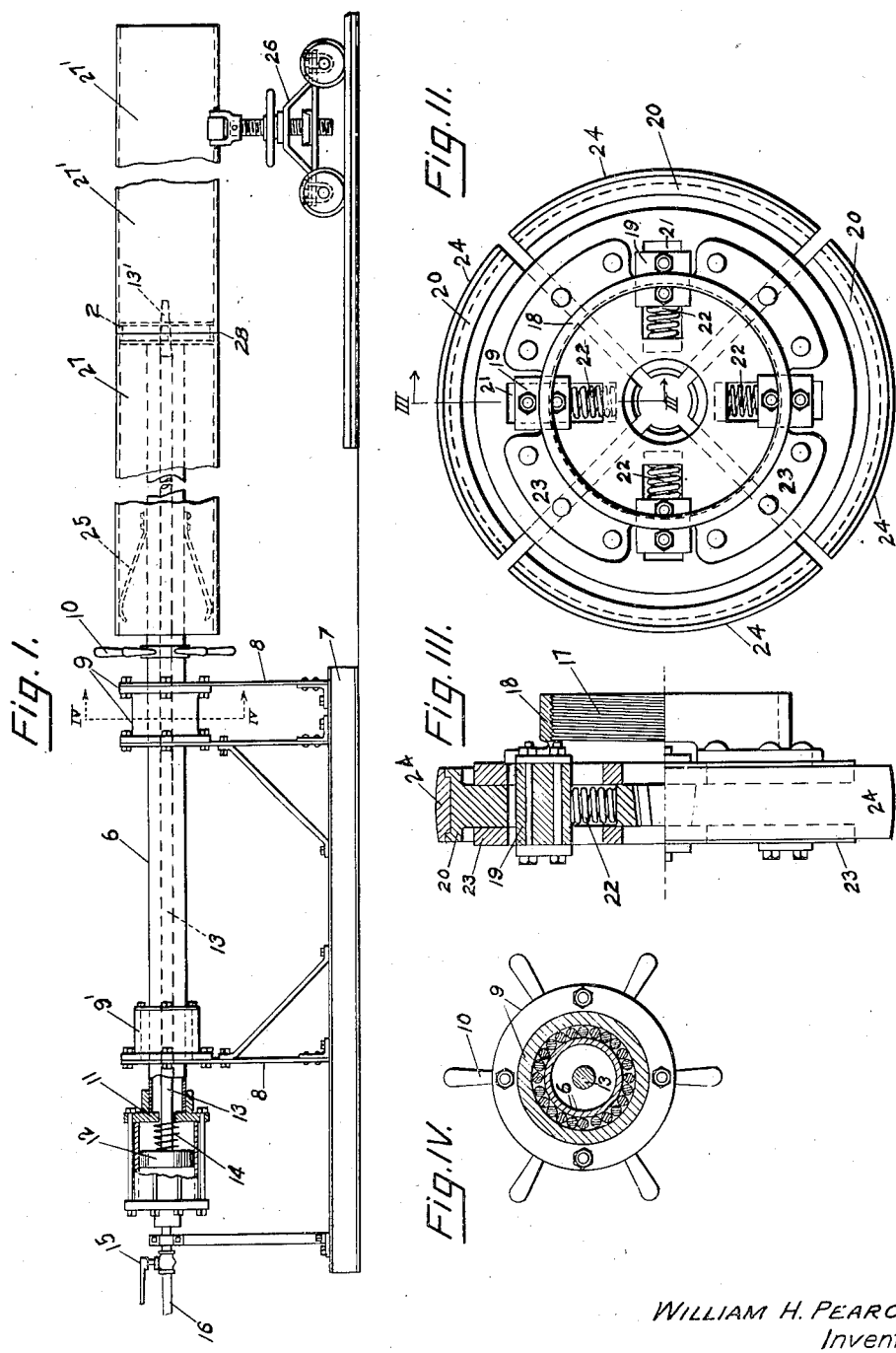

1,642,825

UNITED STATES PATENT OFFICE.

WILLIAM H. PEARCE, OF PORTLAND, OREGON, ASSIGNOR TO COAST CULVERT & FLUME CO., OF PORTLAND, OREGON, A CORPORATION OF OREGON.

WELDING MANDREL.

Application filed June 27, 1922. Serial No. 571,321.

My invention relates to improvements in machines for holding cylinders, pipes and structures made of sheet steel and sheet iron and other ferrous materials, which are welded together by the autogenous welding process, and particularly by the process of autogenous electric welding; and the objects of my invention are to provide a means of holding structures to be joined together by autogenous welding in correct alignment and in such a manner that the structures and seam may be revolved to the welding point at the will of the operator and provide a mandrel for the said structures while being welded that will maintain them in true form, and provide a backing for the weld, which will not fuse to the structures being welded.

I accomplish the objects enumerated by the mechanism shown in the accompanying drawing, in which Fig. I is an elevation of a preferred application of my new invention, shown diagrammatically and partly in section and partly broken away; Fig. II is a rear end view, enlarged, of the expansible head shown at numeral 2, Fig. I; Fig. III is a side view of Fig. II, partly sectioned (III—III) (Fig II), and constructed to show the relation of the several parts composing the expansible head (2); Fig. IV is a sectional view, enlarged, taken at IV—IV, Fig. I, and shows in detail the method of supporting the hollow mandrel (6). A base (7) is provided with suitable upright supports (8) supporting bearings (9) and (9') for the hollow mandrel (6), and permitting it to freely revolve within the said bearings (9) and (9') when manually turned by means of the pilot wheel (10) or other suitable means. A cylinder (11) is provided at one end of the hollow mandrel (6) and contains a piston (12) designed to operate by any convenient means, preferably compressed air, for the purpose of imparting a longitudinal motion to a spindle (13). A spring (14) is shown as a conventional method of causing an opposite motion to the spindle (13) when the pressure is released, or the piston may be made double acting. A stop and waste valve (15) is shown as a means of manually controlling the compressed air or other suitable fluid pressure, leading from a source not shown through the pipe (16) to the stop and waste valve (15).

It is evident that a three way cock may be substituted for the stop and waste valve (15) and the piston made double acting by means generally well understood. The spindle (13) has a long tapered portion (13') on the end opposite to the piston (12); and the longitudinal motion of the said spindle (13), caused by the application of the air or similar fluid pressure, as described, causes the expansion of the sections of the expansible head (2), by forcing the tapered portion (13') of the spindle (13) between the sections of the expansible head (2); the construction of which will now be described.

A flange plate (18), having a threaded portion (17), for attaching to the hollow mandrel (6), is provided with a plurality of rectangular lugs (19), which will be securely attached to, or may be made integral with the said flange plate (18); a plurality of expanding sections (20) having slots (21) adapted to fit over the rectangular lugs (19), are provided in the said expanding sections (20), the said slots (21) being longer in their radial dimension than the said lugs (19) to permit a radial motion. The inner portion of said expanding sections (20) is curved, and when said expanding sections (20) are assembled upon the lugs (19), they present a circular outline adapted to being operated upon by the tapered portion of the spindle (13').

The springs (22) are provided and placed within the slots (21) in such a manner as to withdraw the said expanding sections (20) upon the withdrawal of the tapered portion of the spindle (13'). A suitable retaining plate (23) is provided to retain the several parts in operable relation to each other; said retaining plate (23) being attached to the lugs (19) by bolts or other suitable means.

The outer portion of the expanding sections (20) are so curved in outline that, taken together, they form a complete circle or surface similar to that of a cylinder, and it is intended to have a different head for each size of pipe to be welded. The outer portion of the said expanding sections (20) is provided with a shoe (24) of a non-ferrous metal, preferably copper, as it has been found that when made of copper, or of an alloy containing a large portion of copper, that the ferrous metal being welded will not fuse and attach itself to the said expanding sections (20).

A centering device (25) is provided upon the mandrel (6), and is shown supporting a section of pipe (27), which it is desired to weld to another section of pipe (27'), at their adjacent ends represented by the line at numeral 28. Upon placing the sections of pipe (27) and (27') in position as described, pressure is admitted to the cylinder (11) through the stop and waste cock (15), causing a longitudinal movement of the spindle (13) and the expansion of the several expanding sections (20) within the pipes to be welded (27 and 27'). It is apparent that the expansion as just described will bring the two sections of pipe (27 and 27') into substantially perfect alignment and substantially perfect circular outline, and that they may be rigidly held in this position during the process of welding. The operation of welding may be performed by the operator revolving the mandrel (6) at such speed as he may desire to constantly keep his work presented to his welding apparatus. Upon completion of the welding of the circumferential seam (28) the pressure may be released from the cylinder (11), and the tapered portion (13') of the spindle (13) will be withdrawn from the center portion of the expansible head (2) and the two sections of pipe (27 and 27') may be removed as one piece, thus completing the operation.

It is evident that substantial changes in detail of construction may be made in this machine without departing from the principle of my invention. I therefore do not restrict myself specifically to the devices shown and exactly as illustrated. It is also apparent that if non-ferrous structures are to be welded, that the outer surface of the expansible head or backing for the weld should then be made of ferrous metals to prevent the same from fusing with the structures being welded.

What I claim as new and desire to secure by Letters Patent is:

1. In a machine of the character described, a segmental expansible head comprising a plurality of segments, the inner portions of which are adapted to be operated by a tapered spindle, suitable means for holding said segments in operative relation to a cylinder to be welded, and coppery covering for the outer peripheral surfaces of said segments, a hollow mandrel mounting for said segmental expansible head member and means within the hollow of said mandrel for causing selectively, axial movements of said tapered spindle in selective direction.

2. In a segmental head for a machine of the character described, a plurality of segments having inner and outer circular outlines, tapered spindle means for expanding said segments, and an individual coil spring means for returning each segment to its original position, a hollow mandrel mounting for said segmental head and means comprising a cylinder and piston within said hollow mandrel for causing selective axial movement of said tapered spindle.

3. In an autogenous welding device, the combination of an expansible material supporting head, the circumference of which is made up of a plurality of arc like sections having a coppery outer surface, said sections being adapted to move equal distances radially and approximately at right angles to the axis of said head, and tapered spindle means co-operating with springs for controlling the movement of said sections, and self-contained cylinder and piston means for operating said tapered spindle.

4. In a mandrel adapted to hold materials to be welded by autogenous welding processes, a sectional expansible head member comprising a plurality of segmental, expanding elements, movable radially, a mounting for said segmental expanding elements, spring means for normally retaining said expanding elements in a contracted position, tapered spindle means movable axially to said expansible head member and adapted to cause expansion of said expanding elements, a hollow mandrel element upon which said expansible head member is mounted and means within said hollow mandrel comprising a double-acting cylinder and piston for operating said tapered spindle.

WILLIAM H. PEARCE.